(12) United States Patent
Wagner et al.

(10) Patent No.: US 11,797,007 B2
(45) Date of Patent: Oct. 24, 2023

(54) METHOD AND ARRANGEMENT FOR STORING AND RECALLING OF SETTING VALUES OF AN AGRICULTURAL VEHICLE OR IMPLEMENT

(71) Applicant: Deere & Company, Moline, IL (US)

(72) Inventors: Stefan M. Wagner, Saarbrücken (DE); Steven R. Procuniar, Urbandale, IA (US)

(73) Assignee: DEERE & COMPANY, Moline, IL (US)

( * ) Notice: Subject to any disclaimer, the term of this patent is extended or adjusted under 35 U.S.C. 154(b) by 178 days.

(21) Appl. No.: 17/000,868

(22) Filed: Aug. 24, 2020

(65) Prior Publication Data

US 2021/0055730 A1      Feb. 25, 2021

Related U.S. Application Data

(60) Provisional application No. 62/890,203, filed on Aug. 22, 2019.

(51) Int. Cl.
*G05D 1/00* (2006.01)
*A01C 17/00* (2006.01)
(Continued)

(52) U.S. Cl.
CPC ......... *G05D 1/0094* (2013.01); *A01C 17/008* (2013.01); *A01C 21/005* (2013.01);
(Continued)

(58) Field of Classification Search
CPC ......... G05D 1/0094; G05D 2201/0201; B60K 35/00
See application file for complete search history.

(56) References Cited

U.S. PATENT DOCUMENTS

| | | | |
|---|---|---|---|
| 7,702,443 B2 * | 4/2010 | Price | G06F 7/70 701/50 |
| 2004/0024510 A1 * | 2/2004 | Finley | G06F 19/00 701/50 |

(Continued)

FOREIGN PATENT DOCUMENTS

| | | | |
|---|---|---|---|
| DE | 102005022476 A1 | 11/2006 | |
| EP | 0458107 A1 * | 5/1991 | ............. A01C 17/00 |

(Continued)

OTHER PUBLICATIONS

Oksanen, T., & Backman, J. (2015). Standardization proposal on Implement guidance for ISO 11783 compatible tractor-implement systems. (Year: 2015).*

(Continued)

*Primary Examiner* — Elaine Gort
*Assistant Examiner* — Brittany Renee Peko
(74) *Attorney, Agent, or Firm* — HANLEY, FLIGHT & ZIMMERMAN, LLC

(57) ABSTRACT

A method and arrangement for storing and recalling of setting values of a vehicle (10) and/or implement (14) that can be used for agricultural purposes comprising the following steps: inputting of at least one setting value for an actuator (49) of the vehicle (10) and/or implement (14) by a user interface; transmitting of a command based on the setting value to a control unit (32, 34, 38, 48) standing in operational connection with the actuator (49); and storing of setting data based on the setting value in a memory (72) in order to recall the setting value on the user interface or another user interface as required, wherein the setting value is converted into setting data using meta data regarding technical properties of the vehicle (10) and/or implement (14), the setting data representing a physical measure of the adjustment of the vehicle (10) and/or implement (14) achieved by the actuator (49) based on the setting value, the (Continued)

measure calculated based on the meta data and the setting value, and the setting data stored together with the meta data.

9 Claims, 2 Drawing Sheets

(51) Int. Cl.
    *A01C 21/00*     (2006.01)
    *B60K 35/00*     (2006.01)
    *A01C 15/00*     (2006.01)

(52) U.S. Cl.
    CPC .............. *B60K 35/00* (2013.01); *A01C 15/00* (2013.01); *G05D 2201/0201* (2013.01)

(56) References Cited

U.S. PATENT DOCUMENTS

| | | | | |
|---|---|---|---|---|
| 2009/0248258 | A1* | 10/2009 | Fukumoto | G06F 19/00 701/50 |
| 2013/0274925 | A1* | 10/2013 | Oates | G05B 19/46 700/275 |
| 2017/0024107 | A1* | 1/2017 | Reichhardt | G06F 3/0488 |
| 2017/0200393 | A1* | 7/2017 | Ferrari | G09B 19/167 |
| 2018/0057017 | A1* | 3/2018 | Procuniar | B60W 50/085 |
| 2018/0164797 | A1* | 6/2018 | Meiners | G05D 1/0016 |
| 2019/0104674 | A1* | 4/2019 | Sawaki | A01B 76/00 |
| 2022/0346304 | A1* | 11/2022 | Allgaier | A01B 79/02 |

FOREIGN PATENT DOCUMENTS

| | | |
|---|---|---|
| EP | 0458107 | 11/1991 |
| EP | 0870654 A2 | 10/1998 |
| EP | 2622955 | 8/2013 |
| EP | 2804139 A1 | 11/2014 |
| EP | 2870849 A1 | 5/2015 |
| EP | 3301625 A1 | 4/2018 |
| WO | WO2017192758 A1 | 11/2017 |
| WO | WO2017192762 A1 | 11/2017 |
| WO | WO2017214440 A1 | 12/2017 |
| WO | 2019096525 | 5/2019 |

OTHER PUBLICATIONS

European Patent Office, "Extended European Search Report and Opinion," issued in connection with European Patent Application No. 20189414.4, dated Jan. 20, 2021, 18 Pages. (Non-certified Machine Translation provided).

* cited by examiner

METHOD AND ARRANGEMENT FOR STORING AND RECALLING OF SETTING VALUES OF AN AGRICULTURAL VEHICLE OR IMPLEMENT

TECHNICAL FIELD

The invention concerns a method and an arrangement for storing and recalling of setting values of a vehicle and/or implement that can be used for agricultural purposes.

BACKGROUND

At the time of filing of the present application, a current standard for the control of agricultural equipment that can be connected to a vehicle is ISO 11783. Bus systems designed according to this standard include electronic control units that control the actuators of the vehicle or of the attached or otherwise coupled implement, and/or measured values obtained from sensors. One or more cooperating control units are referred to as a working set. The control units are connected to each other and to a so-called virtual terminal by a data bus (hereinafter simply referred to as a bus). The virtual terminal allows an indication of measured operating parameters and/or their setpoints and an input of desired setpoints for particular parameters by an operator and thus serves as an operator interface for the control units or working sets.

ISO 11783, Part 6 specifies that a virtual terminal provides a square data mask surface. In addition, buttons or touch-sensitive screens are provided, which are used for selecting an input field on the screen, for editing values in the input field, for selecting the respective working set to be displayed and as software-defined keys. The screen also shows the meaning of the software-defined keys.

Upon initialization of the bus system, the virtual terminal first transmits configuration information to the display implement to the individual control units or working sets. The control units then send sets of objects to the virtual terminal. The sets of objects, also referred to as object pools, contain all the necessary attributes and instructions for the virtual terminal to fully process the object and build a corresponding display mask. The virtual terminal stores the object pools in a variable (non-static) memory area. There is an object pool for each work ensemble. Each object in the object pool is assigned a unique address, so that the objects can be addressed individually. When an object is to be displayed on the screen, it is invoked by the control unit or working set through a single change activation message and does not require significant traffic on the network. It is possible to store the object pools in a non-volatile memory area of the virtual terminal, including the current attributes and entered values. Accordingly, the current values entered are stored on the virtual terminal and in the work ensembles. The setting values can therefore no longer be used if the implement is replaced by a slightly different (or even identical) implement, but must then be re-entered, since the memory of the object pools in the virtual terminal is based on an identification of the object pool.

It has also been proposed in the prior art to store setting values for vehicle equipment selected by a particular operator at a central location and to retrieve them operator-specifically (EP 0 870 654 A2), download setting values for centrifugal spreaders or headland sequences from a central database (EP 2 870 849 A1, EP 2 804 139 A1), as well as setting values for vehicles and implements by the operator or service provider entered and retrievably stored in a database (WO 2017/214440 A1, WO 2017/192758 A1, WO 2017/192762 A1, EP 3 301 625 A1). Again, there is the disadvantage that the set values are entered and retrieved only for a single implement, which makes a new input required if the implement is not available and should be replaced by another, possibly even identical, implement. There is also a disadvantage that the set values are retrieved for only one configuration of the implement, which makes a new input required if the implement is intended to be used in a different configuration.

ISO 11783, Part 10 describes a so-called task controller, which makes it possible to schedule work to be carried out on a farm management information system and to send corresponding orders (tasks) to the mobile implement control system. Data regarding completed orders will be returned to the farm management information system. The farm management information system receives data from an implement manufacturer describing the implement based on which the work is planned. The data describing the implement is also sent to the mobile implement control system, which needs it to control the implement. In the case of a field sprayer, the description includes the geometry of the sections or nozzles, the number of tanks and their volumes, and supported process data variables. A control unit (task controller) of the mobile implement control system receives the tasks and allows them to be processed, providing an operator interface on the virtual terminal that can enable to select, start, pause, and resume or change a task from a list, or to create a new task. In this way, it is for example possible to pre-plan partial area-specific spray tasks for field sprayer and perform them in an automated manner. As mentioned above, to create and execute the orders, it is necessary to have precise data regarding the physical characteristics of the particular implement, which makes it necessary to repeat the entire planning in case one implement should not be available to create a new plan for another, different implement.

Object

The object on which the present invention is based is seen therein, to provide a method and arrangement for storing and recalling of setting values for agricultural vehicles and implements, in which the disadvantages mentioned above are avoided or at least reduced, i.e. to be able to use settings made at one time by an operator also on other and in particular not identical vehicles and implements.

SUMMARY

This object is achieved by the subject matter of claims 1 and 8, wherein the following claims features are mentioned improving the solution in advantageous manner.

A method and an arrangement for storing and recalling of setting values of a vehicle and/or implement that can be used for agricultural purposes comprises the following steps:
inputting of at least one setting value for an actuator of the vehicle and/or implement by a user interface,
transmitting of a command based on the setting value to a control unit standing in operational connection with the actuator, and
storing of setting data based on the setting value in a memory in order to recall the setting value on the user interface or another user interface as required,
wherein the setting value is converted into setting data using meta data regarding technical properties of the vehicle and/or implement, the setting data representing a physical measure of the adjustment of the vehicle and/or implement achieved by the actuator based on the setting value, the measure calculated based on the meta data and the setting value, and the setting data stored together with the meta data.

In other words, not just any abstract setting values only useful for the particular vehicle and/or implement for which they were input, but generalized setting data derived therefrom are stored together with meta data containing concrete technical information regarding the vehicle and/or implement. The setting data are calculated on the basis of the metadata and represent one or more physical quantities which are actually achieved by the actuator controlled with by the associated setting value. This achieves a storing of setting data that can be used not only for the specific vehicle and/or implement, but also another vehicle and/or implement that does not have to be identical to the vehicle and/or implement used when entering the setting value, but can also come from another manufacturer, for example. The setting data can therefore be used much more universal than before, without having to re-enter it when changing a vehicle or implement. The procedure according to the invention is suitable for any agricultural vehicles and implements and also other utility and work vehicles, in particular for self-propelled tractors and harvesters.

When recalling the setting data, a setting value can be calculated on the basis of the stored setting data and metadata with regard to technical properties of the respective (and possibly also different) vehicle and/or implement and displayed by the user interface and/or a command based on the calculated setting value be sent to a control unit.

The metadata may include information regarding the type of implement and/or vehicle, a description of the physical quantity affected by the setting value and its unit of measurement, while the setting data represents the respective value of the physical variable.

The setting data can be calculated by a processor of the user interface, on which runs a software specific to the respective vehicle and/or implement, which listens to the data traffic in the user interface and also provides the setting values and the metadata and stores the latter together with the setting data. However, it would also be conceivable to use a separate processor for generating the setting data, which is in operative connection with the operator interface, the control unit and/or a transmission means which is used to transmit the setting values from the user interface to the control unit and is configured to pick up setting values from one or more of said implements by querying or listening to the data traffic passing through the transmission means (see EP 3 301 625 A1, the disclosure of which is incorporated herein by reference). Since the software is specific to the particular vehicle and/or implement, it can also contain all the metadata or at least part of it in a permanently stored form.

The processor may determine the metadata and/or setting data based on setting values associated with different actuators of the vehicle and/or implement. Accordingly, it is used, for example, that the setting of certain actuators of a vehicle, in particular the interface for mounting the implement, depends on which type of implement is connected to the vehicle. This information can be used to create the metadata and using the latter and the setting values to calculate the setting data.

The meta data and setting data can be transmitted to a remote location (for example a server) from where they can be recalled from the user interface of another vehicle and/or implement.

The user interface can be a virtual terminal connected by a bus to the control unit. Herein in particular a protocol according to ISO 11783, Part 6 can be used.

BRIEF DESCRIPTION OF THE DRAWINGS

An embodiment described in more detail below is shown in the drawings, in which.

DETAILED DESCRIPTION

Figure 1:
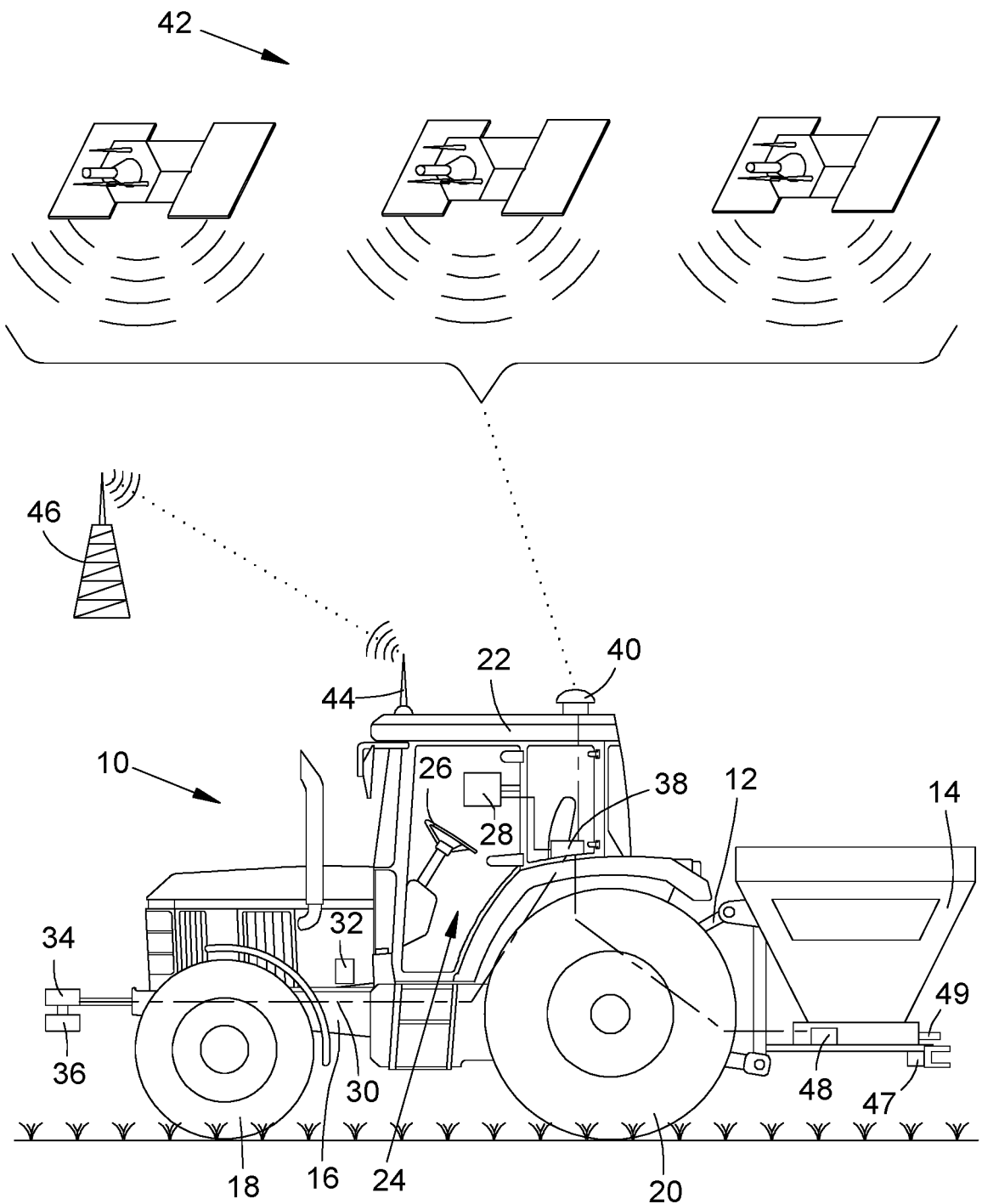
FIG. 1 shows a lateral view of a vehicle with a mounted implement.

FIG. 1 shows a side view of a self-propelled agricultural vehicle 10 in the form of a tractor and an implement 14 in the form of a centrifugal fertilizer spreader attached to a three-point hitch 12 of the machine 10. The vehicle 10 is mounted on a supporting frame 16 which is supported on steerable front wheels 18 and drivable rear wheels 20 and carries a cab 22 in which an operator workstation 24 is located. The operator workstation 24 includes a steering wheel 26, a seat, pedals (not shown) and a virtual terminal 28.

The virtual terminal 28 is connected to a data transfer implement 30, which in the illustrated embodiment is a serial data bus. Furthermore, an electronic control unit 32 of an internal combustion engine for driving the wheels 20 and further driven elements of the machine 10, such as a generator for supplying the electrical system with a supply voltage, is connected to the data transmission implement 30. The control unit 32 is connected to actuators for controlling the injection system of the internal combustion engine and sensors for detecting its operating state. Also, a control unit 34 of a plant status sensor 36 on the front of the machine 10, a navigation unit 38 of a navigation computer for determining position and navigation, for determining the current position with an antenna 40 for receiving signals from satellites 42 and a radio antenna 44 for receiving signals a reference station 46 is connected and communicates via the data transmission implement 30 with a control unit (not shown) which controls an actuator for the steering of the front wheels 18, and a control unit 48 for controlling the fertilizer spreader 14 are connected to the data transmission implement 30. The control unit 48 is connected to an actuator 49, which defines the amount of fertilizer discharged from the implement 14, and a sensor 47, which detects how much material is actually being discharged. The control units 32, 34, 38 and 48 and the virtual terminal 28 exchange messages with each other during the operation of the machine 10 via the data transmission implement 30. Some or all of the control units 32, 34, 38 and 48 may be grouped into so-called working sets which communicate jointly with the virtual terminal 28 and possibly other control units or work ensembles. The protocol used here preferably corresponds to the standard ISO 11783, while the virtual terminal 28 in particular works according to part 6 of ISO 11783.

Figure 2:
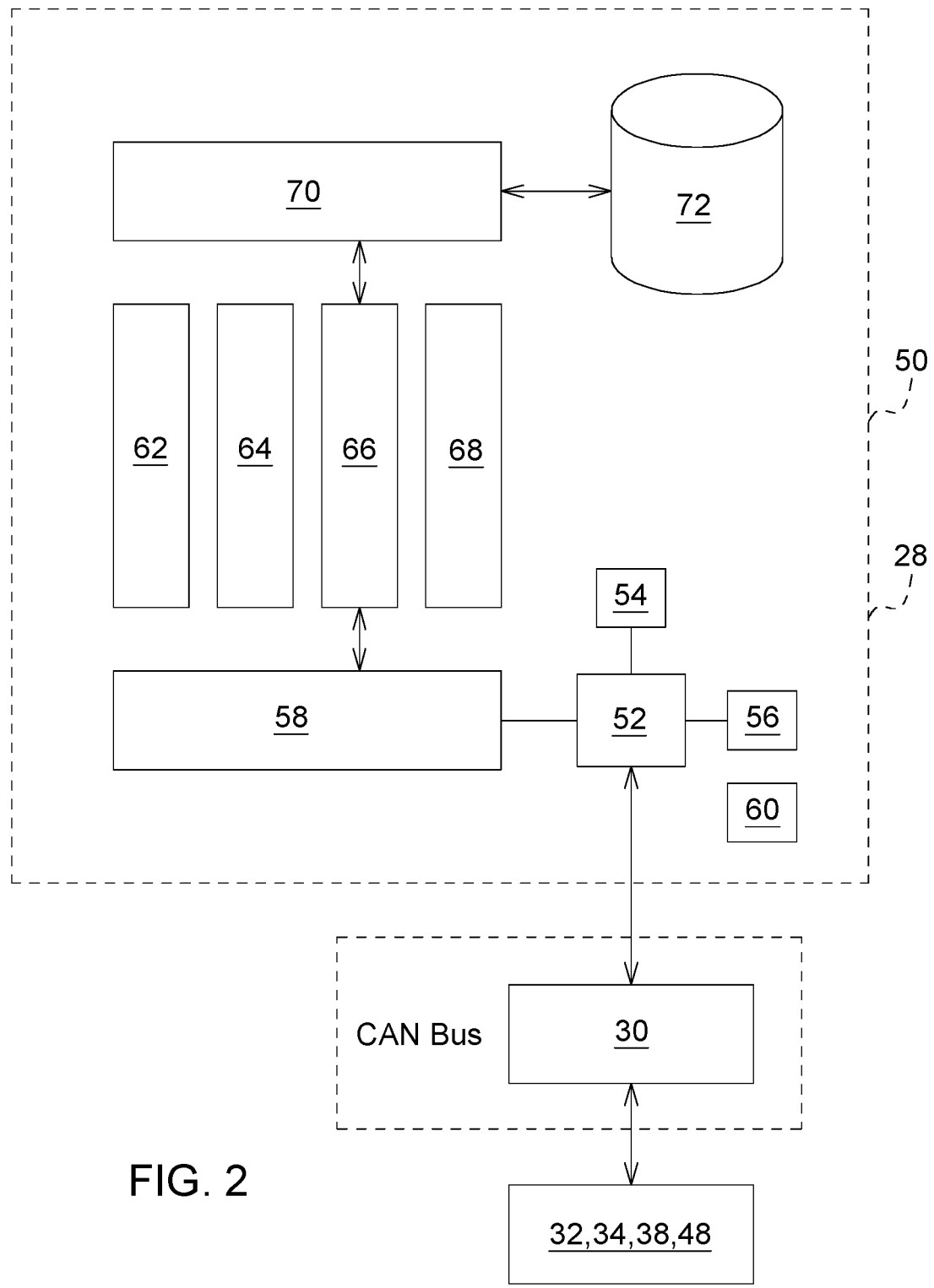
FIG. 2 shows a schematic diagram of a network arrangement used by the vehicle and implement.

The virtual terminal 28 is shown in more detail in FIG. 2. Within a housing 50, a schematically illustrated terminal control unit 52 is arranged, which serves as an interface for the data transmission implement 30, is connected to a driver framework 58, a display implement 54 and with input means 56 in the form of buttons, which could be supplemented or replaced also by a touch-sensitive screen of display 54. Other than illustrated, the terminal control unit 52 could be connected to the data transfer implement 30 via a separate communications processor. The input means 56 may also be mounted in a separate housing and designed in any other way, e.g. B. as a rotatable element with associated encoder. One or more processor(s) 60 realizes the mentioned functions of the said devices 52, 54, 58 and 56.

During operation, a group of input means 56 serves to select the control unit 32, 34, 38 or 48 whose data is to be displayed and to acknowledge an alarm. In the case of a fault or the like, the control unit 32, 34, 38 or 48 issues an alarm, which is displayed without operator input and confirmed by actuating a key of the input means 56. A second group of input means 56 is used to select an input field within an activated data or alarm mask. A third group of input means 56 is for inputting or changing information in an input field. Certain keys of this group increase or decrease the respective values, while another key is a confirmation key and the lower key is used to exit the input field without changing the data. A fourth group of the input means 56 comprises a further number of keys whose respective meaning is defined by the respectively selected control unit 32, 34, 38 or 48 and displayed on the display implement 54.

The virtual terminal 28 thus serves in a manner known per se (see also ISO 11783, part 6 and DE 10 2005 022 476 A1) for inputting setting values with the input means 56, which are displayed on the display implement 54, sent via the data transmission implement 30 to the control units 32, 34, 38 and 48 and there used to control actuators (e.g. of the internal combustion engine by means of the control unit 32 or the actuator for steering the front wheels 18 or the actuator 49).

The driver framework 58 serves to watch the data traffic on the terminal control unit 52 and to read the setting values input by the input means 56 therefrom (what is considered as an independent invention). Driver modules 62, 64, 66, 68 interact with the driver framework 58, which driver modules 62, 64, 66, 68 are each assigned to a control unit 32, 34, 38, 48 and programmed specifically for them. These driver modules 62, 64, 66, 68 serve on one hand to determine the setting values of the control units 32, 34, 38, 48 assigned to them and on the other hand to generate certain metadata based on information stored in them with regard to the control units 32, 34, 38, 48 assigned to them, for example the type and technical characteristics of the vehicle 10 or apparatus 14 and the relationships between the respective setting values and the physical quantities ultimately represented by the actuators at work. For the implement 14 implemented as a fertilizer spreader implement 14 it is included, for example, in the metadata that it is a fertilizer spreader and the set value x corresponds to a quantity y of metered fertilizer measured in the unit z per unit area. Here, any database can be used, which can be implemented as a table, formula or the like.

The driver modules 62, 64, 66, 68 can be created relatively simply, for example in a simple scripting language such as LUA and transmitted to the terminal 28 wirelessly or via a memory medium.

Using a generalized setting data model 70, the processor 60 (by means of the driver framework 58 and the driver modules 62, 64, 66, 68), on operator request or automatically, whether at regular intervals or after distances traveled or after changing a set value by the virtual terminal 28, based on the metadata and the respective setting value, the metadata and one or more setting data are stored in a memory 70, which base on the actual setting value.

The setting values are converted into the setting data using the metadata which represent a physical quantity of the actuator-based adjustment calculated from the adjustment value and the metadata and based on the setting value of the vehicle 10 and/or the implement 14. In the case of the fertilizer spreader of FIG. 1 is thus stored, how much fertilizer is actually applied in $kg/m^2$.

For other implements 14, meta data and corresponding setting data representative for the respective implement are stored, in the case of a field sprayer, for example, the nozzle type, agitator settings, data on circulation lines and/or the working height, liquid density and/or edge nozzles and/or partial width switches. In the case of a liquid manure tank, the tire air pressure for transport and field, the velocities of the lift of the expelling elements, the minimum and maximum lift height of the expelling elements and/or the idle speed of a feed pump for manure can be stored.

The pairs of metadata and setting data stored in the memory 72 can, together with identifiers identifying them (which relate, for example, to the respective position, the vehicle and/or implement and/or the respective task and can be assigned automatically or by the operator via the virtual terminal 28) wirelessly or via a portable memory means transmitted to a remote location, e.g. a cloud-based server or directly to another vehicle 10. There, said metadata and setting data may be selected by an operator from a number of offered metadata and setting data, e.g. by name, or are downloaded from the server together with task data fora particular task or location, where the implement 14 or vehicle 10 is located, or after docking a implement 14 to the vehicle 10, the implement 14 becomes automatically detected and the associated metadata and setting data are automatically downloaded from the server.

In retrieving the metadata and setting data pairs stored in memory 72, the adjustment data model 70 is again used to reconstruct the setting values. In this case, should the vehicle 10 and/or implement 14 no longer be the one with which the metadata and setting data were generated, the respective metadata of the current vehicle 10 and/or implement 14 are also used to generate the setting values. This gives the possibility of using setting values used with a first vehicle 10 and/or implement 14 also on a second vehicle 10 and/or implement 14, which need not be identical to the first vehicle 10 and/or implement 14, but instead from another series, design or even from another manufacturer. In this way, one avoids time-consuming new inputs when changing the implement 13 and/or the vehicle 10. It should be noted that on the virtual terminal software can run for inputting the setting values having a menu depth of 2, 3 or more steps.

The described procedure can be used not only for the actuator 49 but for the actuators of all control units 32, 34, 38, 48. For example, settings entered by the operator into the virtual terminal of the control unit 32 for the internal combustion engine (such as speed or power), a PTO, workstation settings (seat position, joystick and armrest occupancy, etc.), a control unit (not shown) for controlling the position an interface for the implement 14, e.g. the three-point hitch, and the control unit 38 of the navigation computer (such as an automatic steering, in which certain dimensions of the vehicle 10 and/or implement 14 are to be entered, headland sequences and/or data relating to performed agricultural measures for documentation purposes and/or site-specific application rates) be stored in the mentioned manner and retrieved again.

The above-described geo-referenced stored metadata and adjustment data can also be used for other purposes, such as the documentation of performed work, for accounting purposes and/or as input data for agricultural models, with which further work can be planned.

The terminology and headings used herein is for describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangements not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be limited by the foregoing description but is only limited by the scope of the appended claims.

The invention claimed is:

1. A method for storing and recalling of setting values of at least one of a first vehicle or a first implement that can be used for agricultural purposes, the method comprising:

inputting, by a user interface, a first setting value for a first actuator of the at least one of the first vehicle or the first implement;

transmitting a command based on the first setting value to a control unit operatively coupled to the first actuator;

converting the first setting value into setting data using first meta data regarding technical properties of the at least one of the first vehicle or the first implement, the setting data representing an output of material of the at least one of the first vehicle or the first implement achieved by the first actuator based on the first setting value, the output of material calculated based on the first meta data and the first setting value, the setting data stored with the first meta data in a memory for use in recalling the first setting value on the user interface; and calculating, based on (a) the setting data and (b) second meta data associated with at least one of a second vehicle or a second implement, a second setting value for a second actuator of the at least one of the second vehicle or the second implement to achieve the output of material using the at least one of the second vehicle or the second implement.

2. The method of claim 1, further including:

recalling the setting data by calculating the first setting value based on the setting data and the first meta data; and at least one of displaying the first setting value on the user interface or sending a second command based on the calculated first setting value to the control unit.

3. The method of claim 1, wherein the first meta data include at least one of (a) information regarding a type of the at least one of the first implement or the first vehicle, (b) a description of the output of material affected by the first setting value, or (c) a unit of measurement of the output of material, the setting data to represent a value of the output of material.

4. The method of claim 1, wherein the setting data are calculated by a processor of the user interface, the processor to include software specific to the at least one of the first vehicle or the first implement, the processor to monitor data traffic in the user interface and determine the first setting value based on the data traffic, the processor to provide the first meta data and cause storage of the first meta data with the setting data.

5. The method of claim 4, wherein the processor is to determine at least one of the first meta data or the setting data based on setting values associated with different actuators of the at least one of the first vehicle the first implement.

6. The method of claim 1, wherein the first meta data and the setting data are transmitted to a remote location from where they can be recalled from a different user interface of a different vehicle or a different implement.

7. The method of claim 1, wherein the user interface is a virtual terminal connected by a bus to the control unit.

8. An apparatus for storing and recalling of setting values of at least one of a first vehicle or a first implement that can be used for agricultural purposes, the apparatus comprising:

a user interface for inputting of a first setting value for a first actuator of the at least one of the first vehicle or the first implement;

a data transmission arrangement to transmit a command based on the first setting value to a control unit operatively coupled to the first actuator;

a processor to:

convert the first setting value into setting data using first meta data regarding technical properties of the at least one of the first vehicle or the first implement, the setting data representing an output of material of the at least one of the first vehicle or the first implement achieved by the first actuator based on the first setting value, the output of material calculated based on the first meta data and the first setting value; and calculate, based on (a) the setting data and (b) second meta data associated with at least one of a second vehicle or a second implement, a second setting value for a second actuator of the at least one of the second vehicle or the second implement to achieve the output of material using the at least one of the second vehicle or the second implement; and memory to store the setting data with the first meta data for use in recalling of the first setting value on the user interface.

9. The apparatus of claim 8, wherein the processor is to:

recall the setting data;

calculate the first setting value based on the setting data and the first meta data; and at least one of display the first setting value on the user interface or send a second command based on the calculated first setting value to the control unit.

* * * * *